United States Patent
Khirallah et al.

(10) Patent No.: US 11,984,937 B2
(45) Date of Patent: *May 14, 2024

(54) COMMUNICATION SYSTEM WITH BEAM QUALITY MEASUREMENT

(71) Applicant: NEC Corporation, Tokyo (JP)

(72) Inventors: Chadi Khirallah, Tokyo (JP); Yuhua Chen, Tokyo (JP); Yassin Aden Awad, Tokyo (JP); Alberto Suarez, Tokyo (JP); Robert Arnott, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/900,111

(22) Filed: Aug. 31, 2022

(65) Prior Publication Data
US 2022/0416918 A1  Dec. 29, 2022

Related U.S. Application Data

(63) Continuation of application No. 16/483,221, filed as application No. PCT/JP2018/002678 on Jan. 29, 2018, now Pat. No. 11,476,957.

(30) Foreign Application Priority Data

Feb. 3, 2017 (GB) ...................................... 1701858
Feb. 10, 2017 (GB) ...................................... 1702281

(51) Int. Cl.
*H04B 17/309* (2015.01)
*H04B 7/06* (2006.01)
(Continued)

(52) U.S. Cl.
CPC ......... *H04B 17/309* (2015.01); *H04B 7/0695* (2013.01); *H04W 24/10* (2013.01); *H04W 36/0094* (2013.01); *H04W 36/30* (2013.01)

(58) Field of Classification Search
None
See application file for complete search history.

(56) References Cited

U.S. PATENT DOCUMENTS 11,476,957 B2 * 10/2022 Khirallah ............... H04B 17/24
2016/0285660 A1  9/2016 Frenne et al.
(Continued)

FOREIGN PATENT DOCUMENTS

EP  3284630 A1  1/2018
WO  2018128185 A1  7/2018

OTHER PUBLICATIONS

EP Office Action for EP Application No. 18704319.5 dated Feb. 5, 2021.
(Continued)

*Primary Examiner* — Alex Skripnikov
(74) *Attorney, Agent, or Firm* — Sughrue Mion, PLLC

(57) ABSTRACT

A method, performed by a communication device, including a) measuring a respective beam quality for each of a plurality of beams of a cell, b) identifying, within said plurality of beams, a first group of beams comprising a number, N, of beams, c) selecting, from within said first group of beams, a second group of beams comprising a number, M, of beams, and d) deriving a cell quality for the cell based on the measured beam qualities for the M beams of the second group.

2 Claims, 10 Drawing Sheets

(51) Int. Cl.
*H04W 24/10* (2009.01)
*H04W 36/00* (2009.01)
*H04W 36/30* (2009.01)

(56) References Cited

U.S. PATENT DOCUMENTS

| 2017/0208494 | A1* | 7/2017 | Moon | H04L 5/0048 |
| 2018/0042000 | A1* | 2/2018 | Zhang | H04W 72/23 |
| 2018/0132158 | A1 | 5/2018 | Tseng | H04W 36/0083 |
| 2018/0199328 | A1 | 7/2018 | Sang | H04L 5/001 |

OTHER PUBLICATIONS

"UE Beam Selection for derivation of Cell Level Quality in NR", 3GPP TSG-RAN WG2 Meeting #97, R2-1701678, NEC, Feb. 13-17, 2017 ( 3 pages total).
"On Deriving Cell Quality in NR", 3GPP TSG-RAN WG2 NR Adhoc, R2-1700124, Nokia, Alcatel-Lucent Shanghai Bell, Jan. 17-19, 2017 (3 pages total).
Communication dated Sep. 15, 2020, from the Japanese Patent Office in application No. 2019-541818.
International Search Report dated May 8, 2018, in the corresponding PCT International Application.
Sony; "Cell Quality Measurements for DL Mobility", 3GPP TSG RAN WG1 NR Adhoc, 11-1700671, XP051208 pp. 1-5 (Jan. 16, 2017).
Huwei et al.: "Measurement and Mobility in High Frequency", 3GPP TSG-RAN2 Meeting #Adhoc, R2-1700166, XP051210751, pp. 1-5 (Jan. 17, 2017).
Zte et al.; "Discussion on the Cell Level Quality Derivation", 3GPP TSG-RAN WG2 NR Ad Hoc, R2-1700824, XP051211196, pp. 1-7 (Jan. 17, 2017).
British Search Report daled Aug. 10, 2017, pp. 1-2.
CMCC; "How to Derive a Cell Quality for RRM Measurement", 3GPP R2-1700312, pp. 1-5 (Jan. 17, 2017).
Sony; "Cell Quality Measurement Evaluation using Multiple Beams", 3GPP TSG RAN WG2 NR, R2-1700141, pp. 1-5 (Jan. 17, 2017).
MediaTek Inc, ASUSTek; "Measurement Model for NR", 3GPP TSG RAN WG2, R2-1700272, pp. 1-4 (Jan. 17, 2017).

* cited by examiner

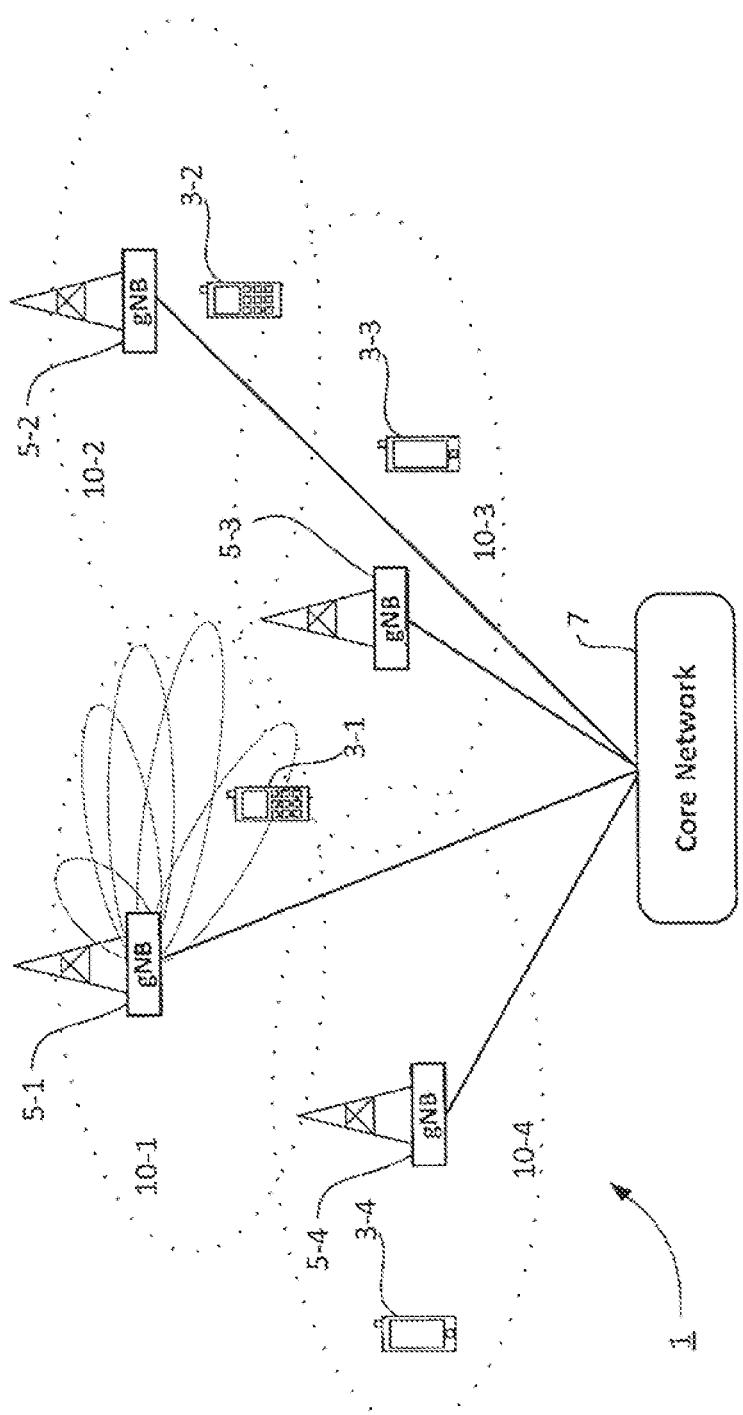
[Fig. 1]

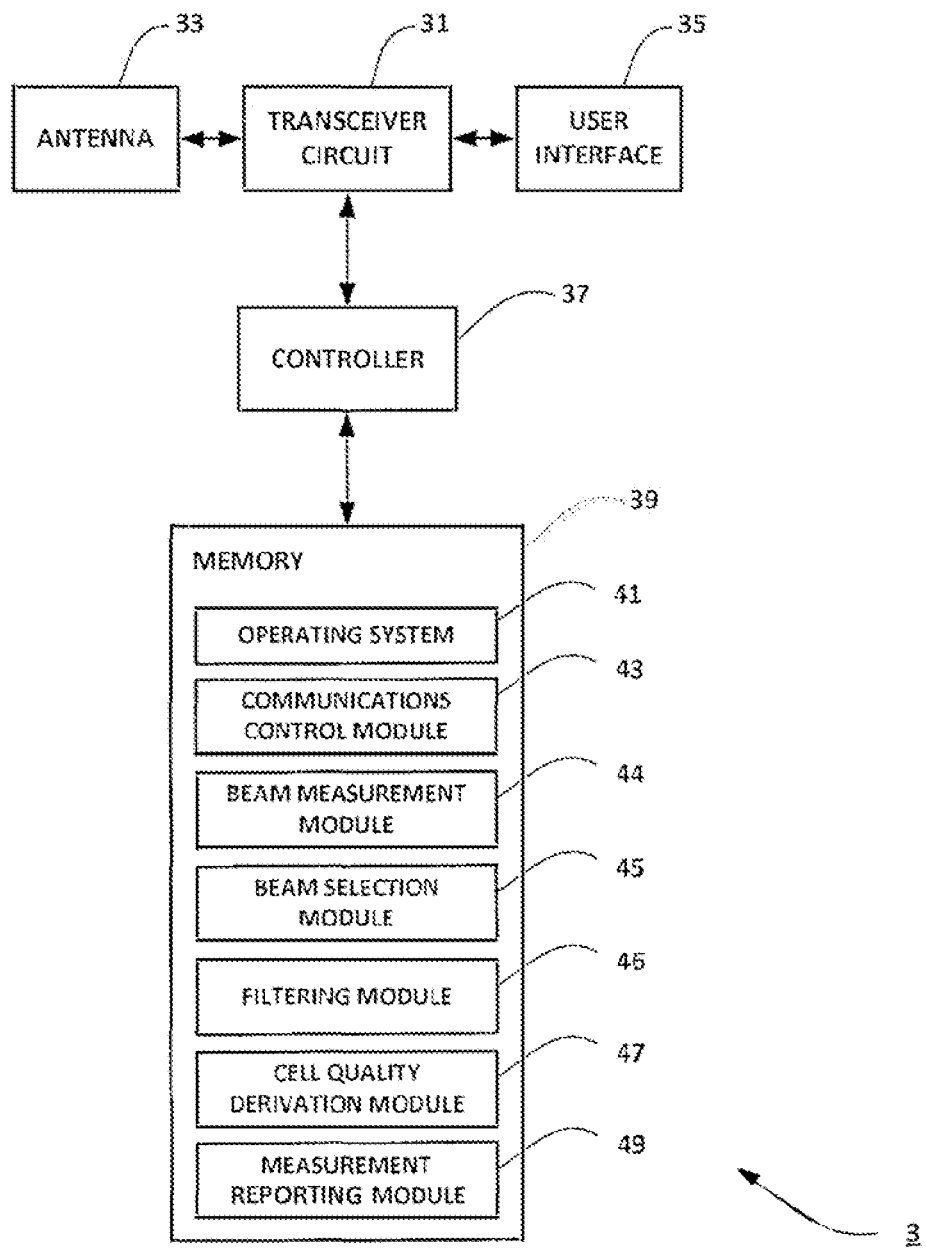
[Fig. 2]

[Fig. 3]
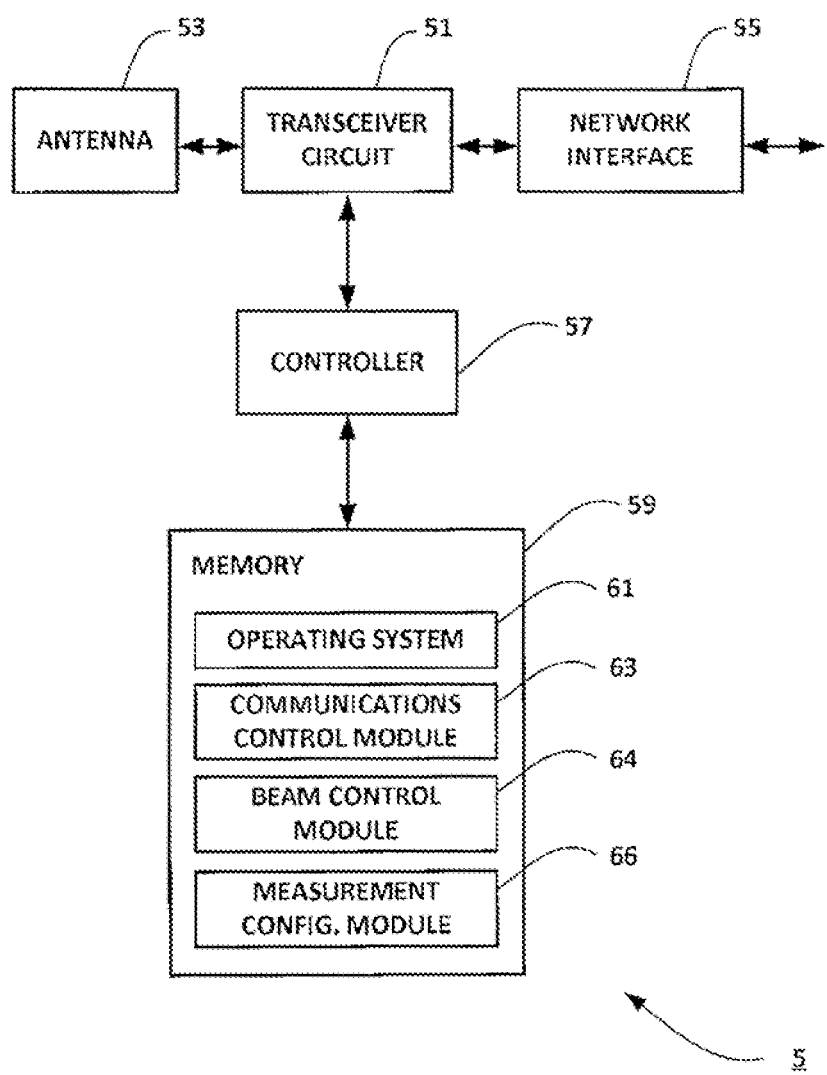

[Fig. 4]
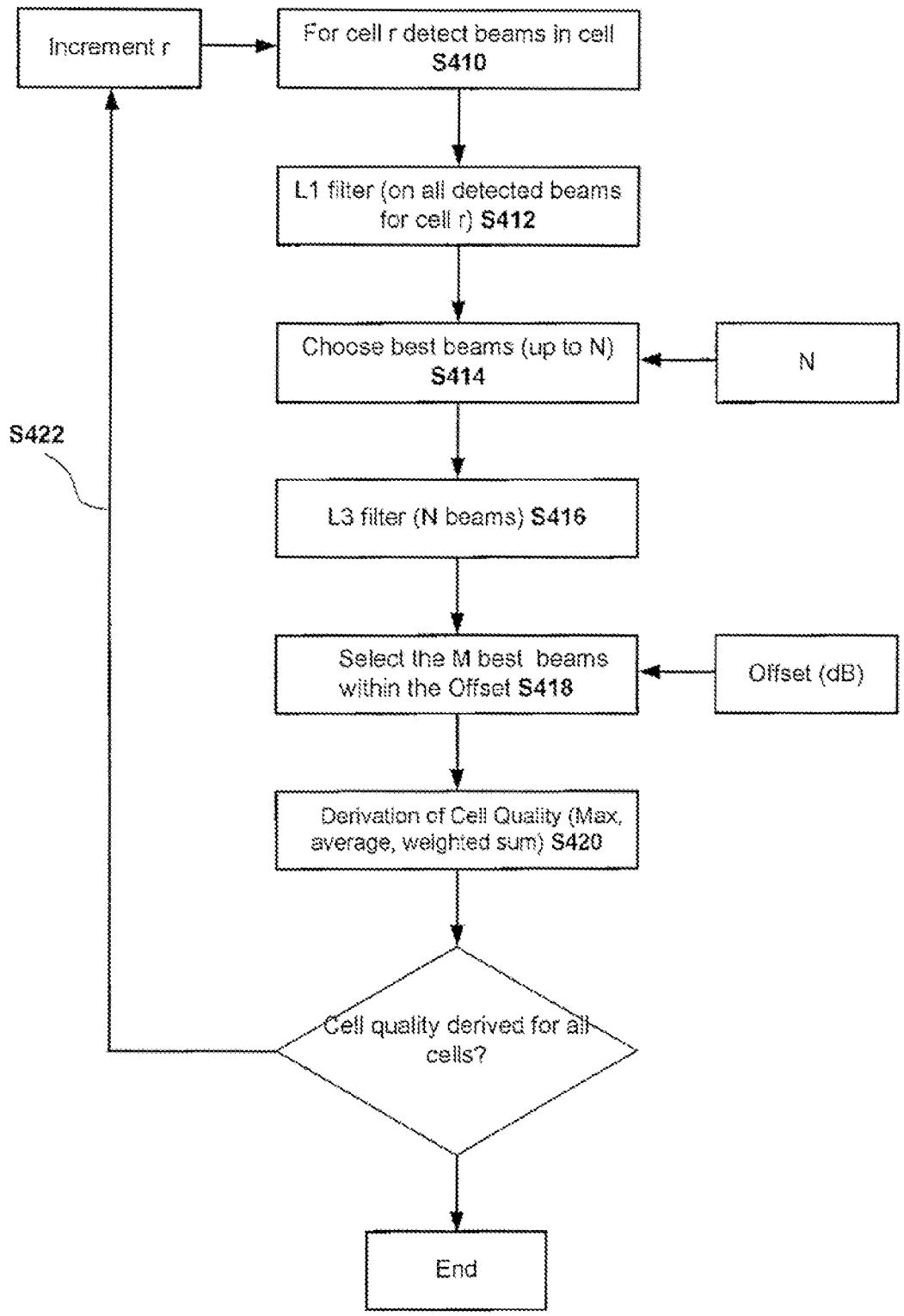

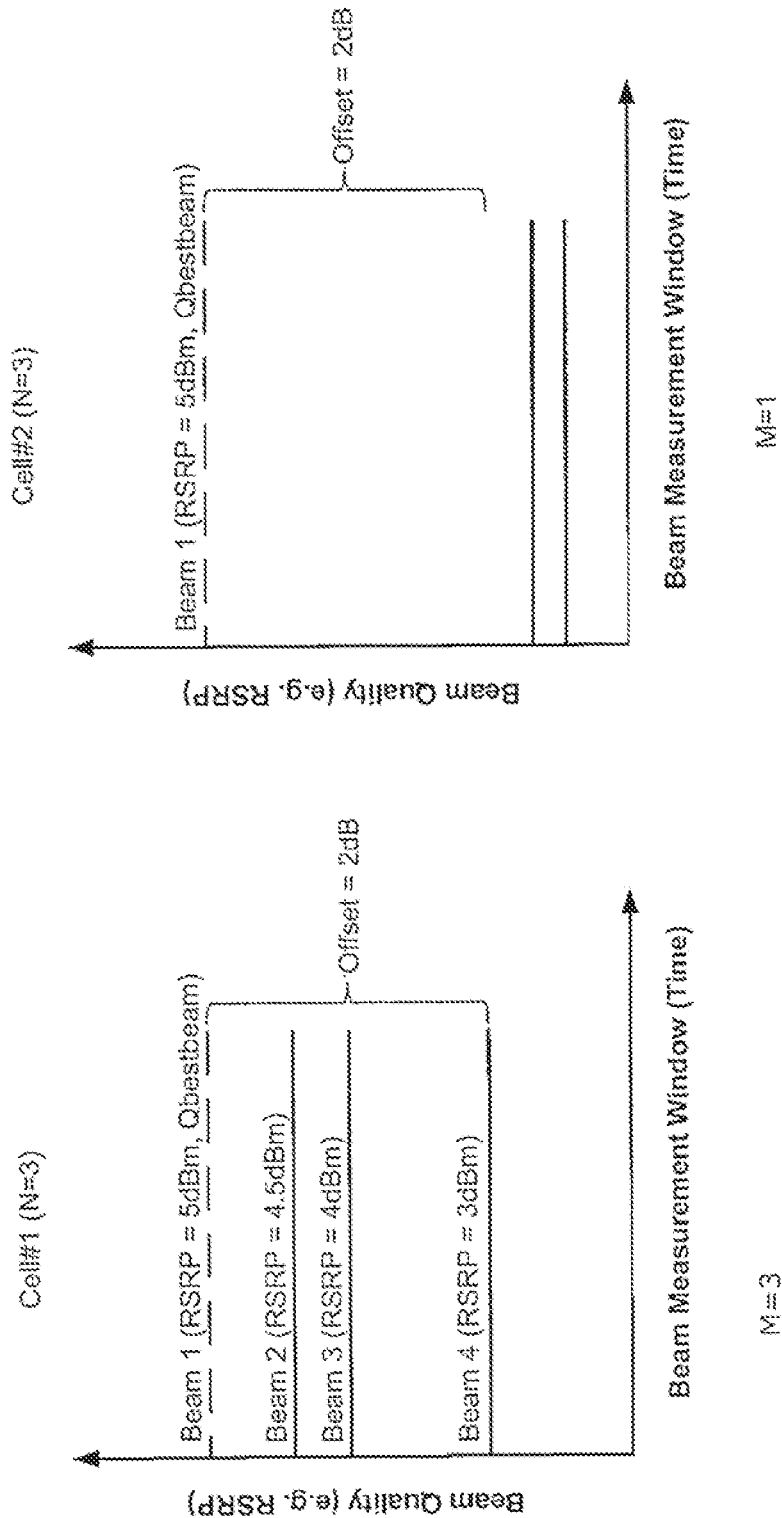

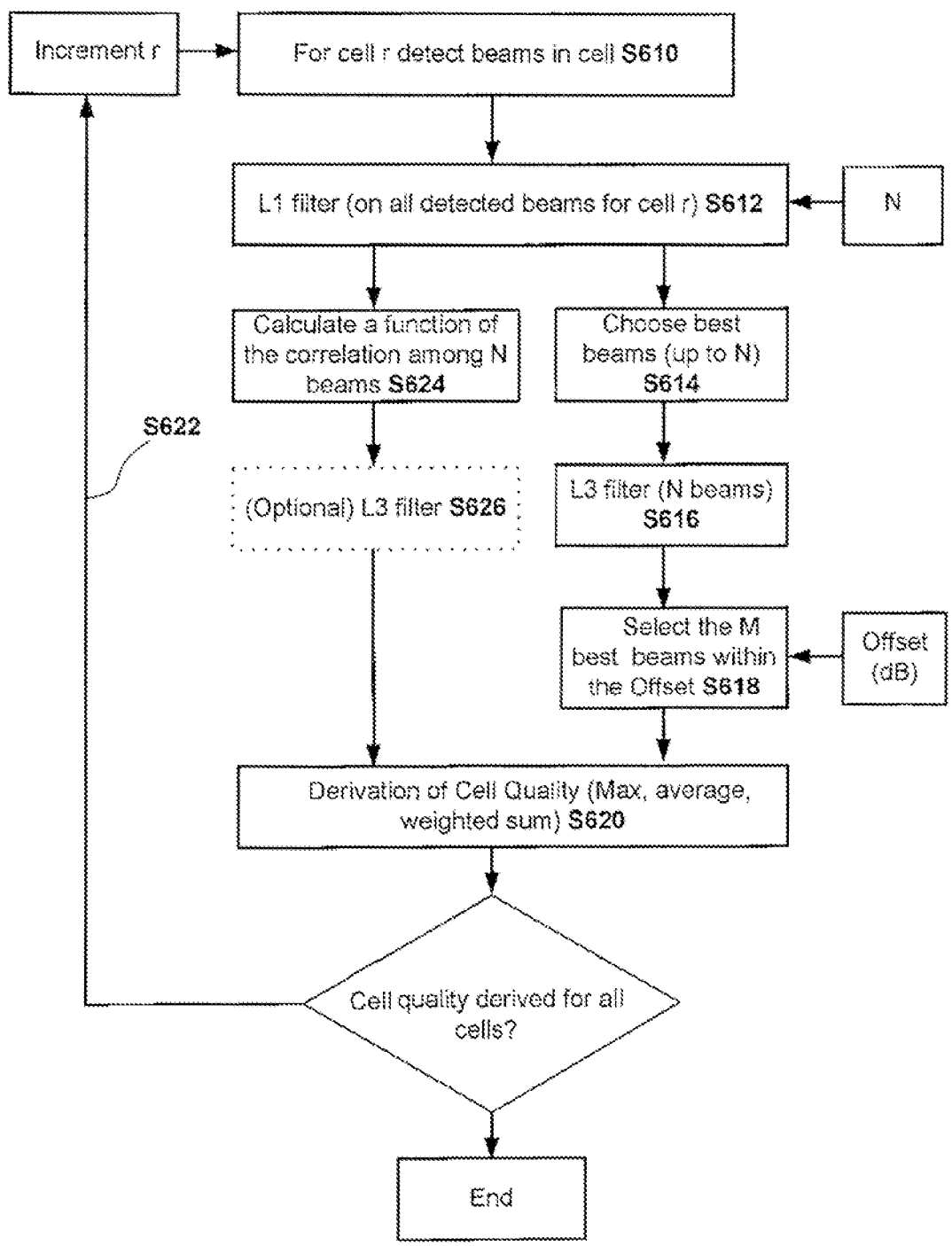
[Fig. 6]

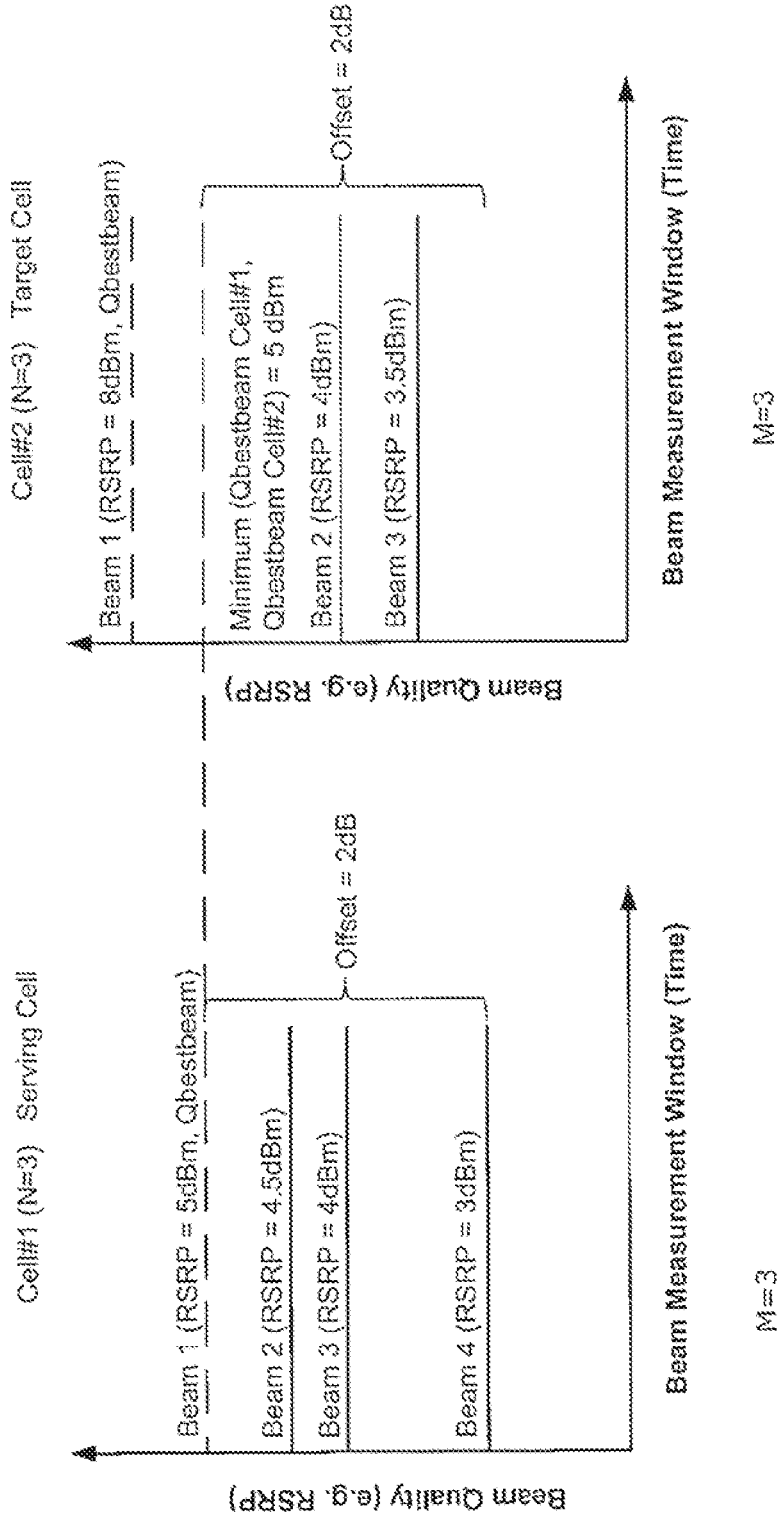

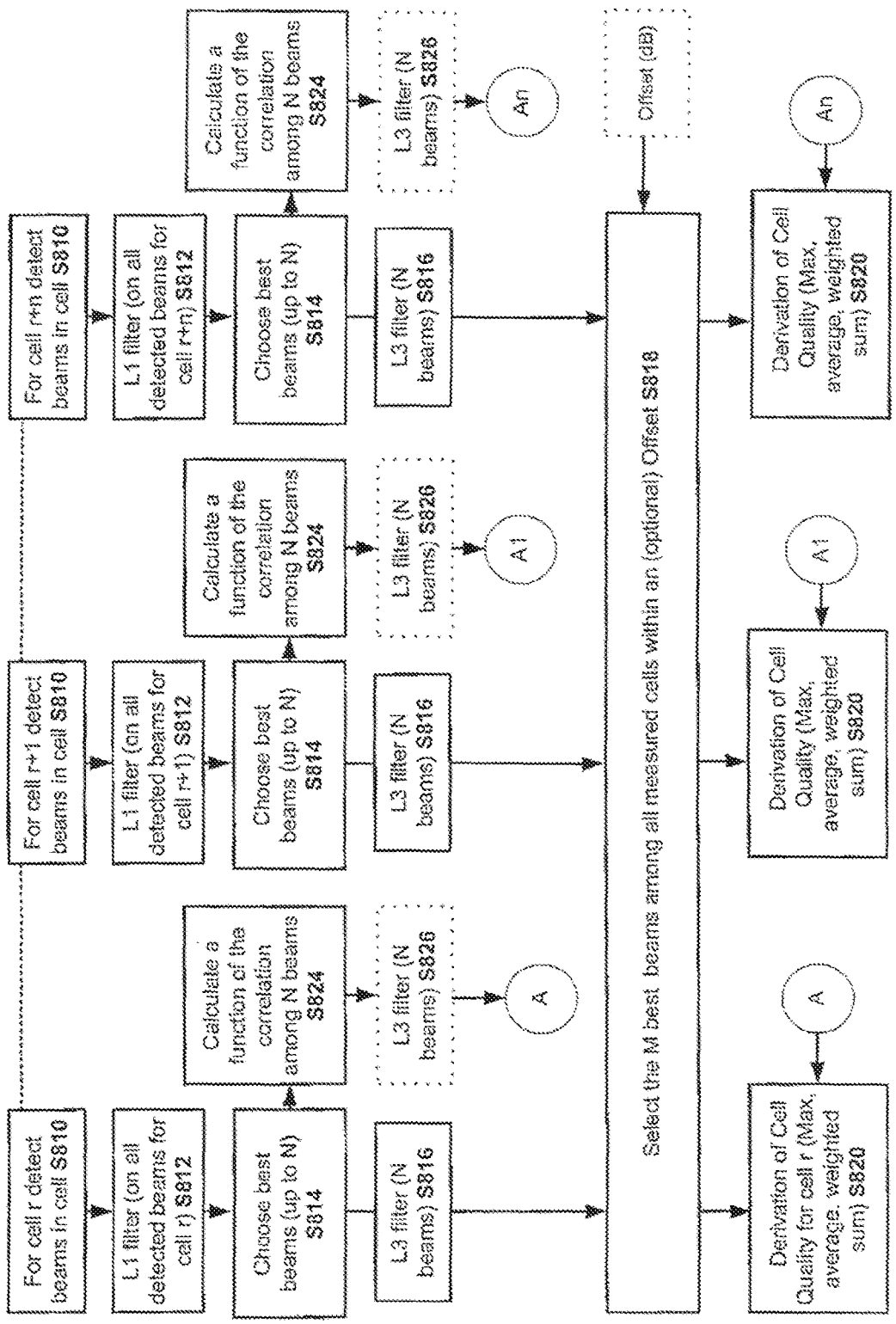

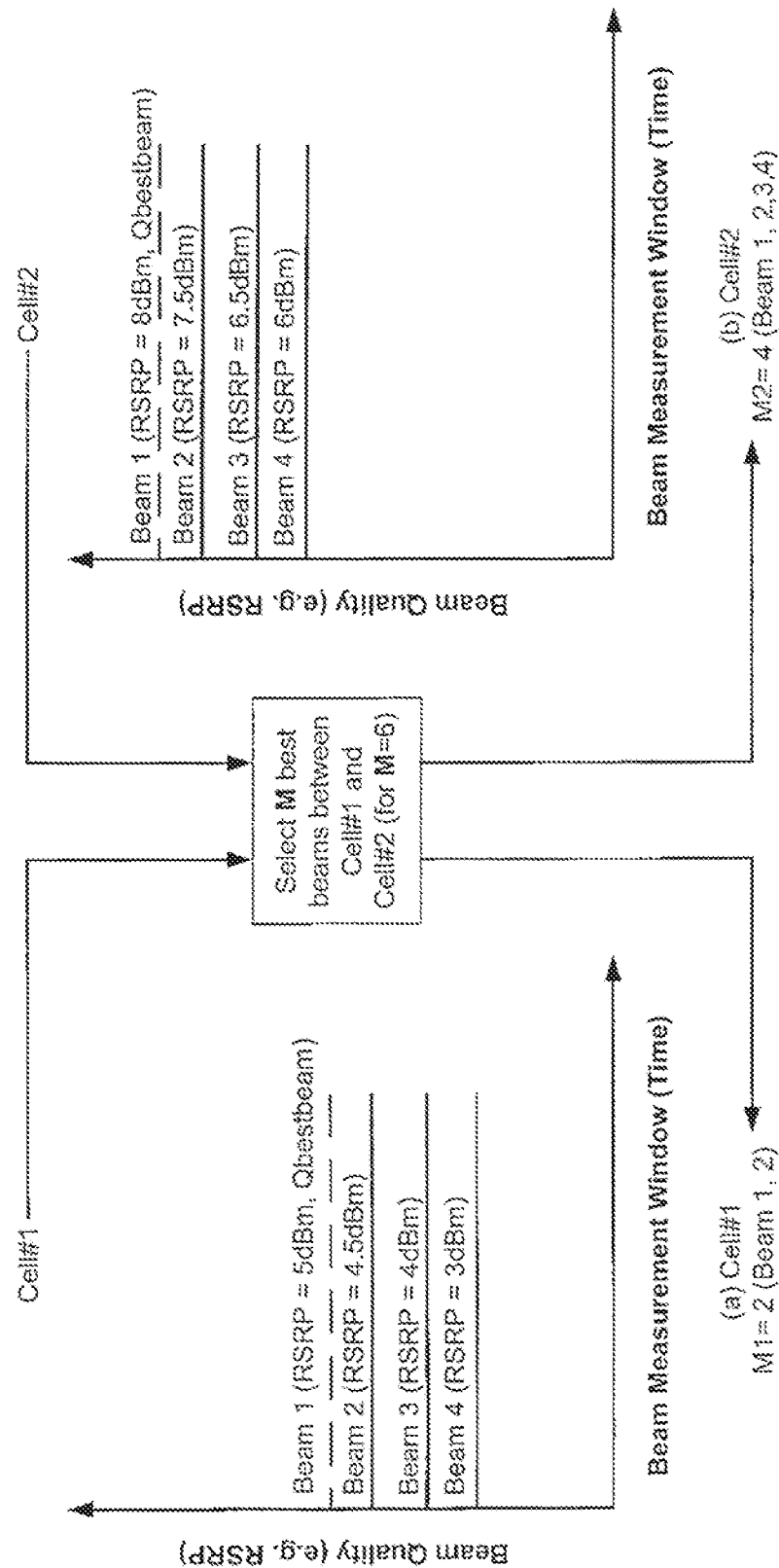

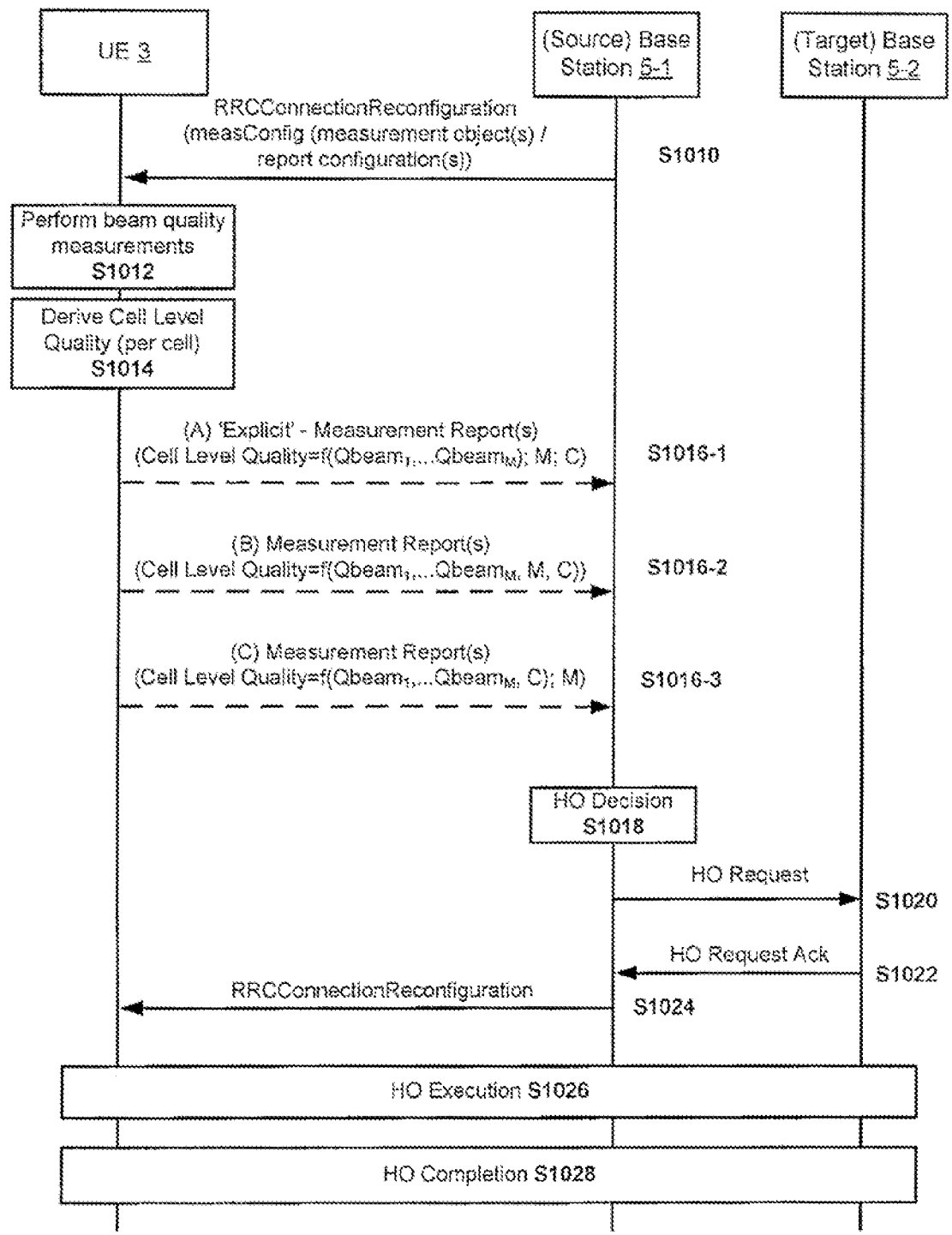

COMMUNICATION SYSTEM WITH BEAM QUALITY MEASUREMENT

CROSS-REFERENCE TO RELATED APPLICATIONS

The present application is a divisional application of U.S. patent application Ser. No. 16/483,221 filed on Aug. 2, 2019, which is a National Stage Entry of international application PCT/JP2018/002678 filed on Jan. 29, 2018, which claims the benefit of priority from United Kingdom Patent Applications No. 1701858.1 filed on Feb. 3, 2017 and No. 1702281.5 filed on Feb. 10, 2017, the disclosures of all of which are incorporated in their entirety by reference herein.

TECHNICAL FIELD

The present invention relates to a communication system. The invention has particular but not exclusive relevance to wireless communication systems and devices thereof operating according to the 3rd Generation Partnership Project (3GPP) standards or equivalents or derivatives thereof. The invention has particular although not exclusive relevance to the measurement of cell quality in the so-called 'Next Generation' systems using beamforming.

BACKGROUND ART

The latest developments of the 3GPP standards are referred to as the Long Term Evolution (LTE) of Evolved Packet Core (EPC) network and Evolved UMTS Terrestrial Radio Access Network (E-UTRAN), also commonly referred as '4G'. In addition, the term '5G' and 'new radio' (NR) refer to an evolving communication technology that is expected to support a variety of applications and services. Various details of 5G networks are described in, for example, the 'NGMN 5G White Paper' V1.0 by the Next Generation Mobile Networks (NGMN) Alliance, which document is available from https://www.ngmn.org/5g-white-paper.html 3GPP intends to support 5G by way of the so-called 3GPP Next Generation (NextGen) radio access network (RAN) and the 3GPP NextGen core network.

Under the 3GPP standards, a NodeB (or an eNB in LTE, gNB in 5G) is the base station via which communication devices (user equipment or 'UE') connect to a core network and communicate to other communication devices or remote servers. For simplicity, the present application will use the term base station to refer to any such base stations and use the term mobile device or UE to refer to any such communication device. The core network (i.e. the EPC in case of LTE) hosts functionality for subscriber management, mobility management, charging, security, and call/session management (amongst others), and provides connection for communication devices to external networks, such as the Internet.

Communication devices might be, for example, mobile communication devices such as mobile telephones, smartphones, user equipment, personal digital assistants, laptop/tablet computers, web browsers, e-book readers and/or the like. Such mobile (or even generally stationary) devices are typically operated by a user, although it is also possible to connect so-called 'Internet of Things' (IoT) devices and similar machine-type communication (MTC) devices to the network. For simplicity, the present application refers to mobile devices (or UEs) in the description but it will be appreciated that the technology described can be implemented on any communication devices (mobile and/or generally stationary) that can connect to a communications network for sending/receiving data, regardless of whether such communication devices are controlled by human input or software instructions stored in memory.

3GPP technical report (TR) 23.799 V0.7.0 describes a possible architecture and general procedures for NextGen (5G) systems planned for Release 14 of the 3GPP standards. 3GPP also studied the potential use of frequency bands up to 100 GHz for new (5G) radio access networks. Directional beamforming and massive antenna technologies may also be used in order to overcome the severe channel attenuation characteristics associated with certain high frequency bands (e.g. mmWave bands). The term 'massive antenna' refers to an antenna having a high number of antenna elements (e.g. 100 or more) arranged in an array. Effectively, such a massive antenna may be used to communicate with several users at the same time, thus facilitating multi-user MIMO (multiple-input and multiple-output) transmissions. A base station (also referred to as a transmission and reception point (TRP) in this case) may be configured to form respective beams for communicating with a plurality of UEs concurrently and using associated directional beams.

Beamforming will be used in NR even for cell-specific channels, for example, for the transmission of reference signals (RS) and system information. For a multiple beam cell, the number of beams and beams patterns in that cell could be defined by a Beam Configuration. This way, different cells will have different beam configurations depending on the coverage requirement of each cell. In order to differentiate the cell beams, each beam has an identifier (e.g., Beam ID) which is unique within that cell.

In order to allow for cell level mobility, Radio Resource Management (RRM) measurements will need to be performed by a UE in a connected active state in order to derive a measurement of cell quality for a given cell. Such RRM measurement for cell level mobility will need to be performed based on a common framework regardless of network beam configurations (e.g. number of beams) in a given cell and the UE beam configuration.

However, current proposals for obtaining cell quality measurements, and in particular for selecting beams on which cell quality measurements should be based, are not ideal and will likely lead to inconsistent measurements that may not accurately reflect the actual quality of a cell. Such inconsistent and potentially inaccurate measurements are undesirable because they could increase the triggering of measurement reporting, the risk of ping-pong handovers and/or other undesirable effects.

There is therefore, a need for improved methods for the selection of beams for derivation of cell level quality, for the derivation of cell quality and/or for the reporting of cell level quality and/or other beam related measurements

SUMMARY OF INVENTION

Technical Problem

The present invention seeks to provide apparatus and associated methods for at least partially meeting one or more of the above needs.

The inventors have considered a number of options for cell quality derivation based on a single beam and on multiple beams and have realised that many of them are not ideal. The inventors have considered, for example: a best beam option; an N best beams option; an all detected beams option; and a beams above a threshold option.

All of these options for selection of beams for measurement have, however, been found to have drawbacks and may not therefore provide accurate indication of cell level quality.

In the best beam option the cell quality measurement for a given cell is based on the quality of the best (highest quality) beam in that cell. However, whilst this may provide a good indication of the cell quality on occasion, due to channel variations, especially in a high frequency case, the UE could find that the best beam is changing very frequently. This could lead to fluctuation in the derived cell quality, and could increase the triggering of measurement reporting, and the risk of ping-pong handover.

In the N best beams option the cell quality measurement for a given cell is based on the quality of a selection of the N best beams in that cell. Whilst this can address some issues with the best beam option, the choice of N best beams does not guarantee that all selected beams are of similar good quality. For example, in the case of N best beams of different beam quality, combining quality measurements of these N beams (e.g. averaging) may result in underestimation of the cell quality. Moreover, the configuration of a suitable N value is complex.

In the all detected beams option the cell quality measurement for a given cell is based on the respective quality of every beam in that cell. In this case, however, the UE would likely be deriving the cell quality based on a mixture of good quality and bad quality beams. Consequently, combining quality of all beams could lead to a significant underestimation of the actual cell quality.

In the beams above a threshold option, the cell quality measurement for a given cell is based on the quality of a selection of beams in that cell that exhibit a measured quality exceeding a given threshold. In this case, however, providing a good indication of cell quality relies on a suitable configuration of the threshold value—which is not trivial. For example, a higher threshold would be appropriate for a UE that is near the centre of a cell than a UE at the cell edge.

In order to at least partially alleviate one or more of the above issues the inventors have proposed a number of alternatives to/variations on the above options that seek to provide at least some benefit over one or more of the above options.

Solution to Problem

In one aspect of the invention there is provided a method, performed by a communication device, the method comprising: a) measuring a respective beam quality for each of a plurality of beams of a cell; b) identifying, within said plurality of beams, a first group of beams comprising a number, N, of beams wherein each beam of said first group exhibits a respective measured beam quality that is among N best measured beam qualities arising from said measuring; c) selecting, from within said first group of beams, a second group of beams comprising a number, M, of beams that have a measured beam quality that is better than, or equal to, a best measured beam quality for the beams within said first group less a preconfigured offset; d) deriving a cell quality for the cell based on the measured beam qualities for the M beams of the second group.

In one aspect of the invention there is provided a method, performed by a communication device, the method comprising: a) measuring, in a serving cell for the communication device, a respective beam quality for each of a plurality of beams of the serving cell; b) identifying, within said plurality of beams of the serving cell, a group of serving cell beams comprising a number, N, of beams, wherein each beam of said group of serving cell beams exhibits a respective measured beam quality that is among N best measured beam qualities arising from said measuring in a first cell, and wherein the group of serving cell beams comprises a best serving cell beam that exhibits a best measured beam quality in said group of serving cell beams; c) measuring in a neighbouring cell of the serving cell a respective beam quality for each of a plurality of beams of the neighbouring cell; d) identifying, within said plurality of beams of the neighbouring cell, a group of neighbouring cell beams comprising a number, N, of beams wherein each beam of said group of neighbouring cell beams exhibits a respective measured beam quality that is among N best measured beam qualities arising from said measuring in a neighbouring cell and wherein the group of neighbouring cell beams comprises a best neighbouring cell beam that exhibits a best measured beam quality in said group of neighbouring cell beams; e) comparing the measured beam quality for the best serving cell beam with a measured beam quality for the best neighbouring cell beam to identify a lowest measured beam quality between said best serving cell beam and said best neighbouring cell beam; f) selecting, from within said group of neighbouring cell beams, a further group of neighbouring cell beams comprising a number, M, of beams that have a measured beam quality that is better than, or equal to, the identified lowest measured beam quality less a pre-configured offset; and g) deriving a cell quality for the neighbouring cell based on the measured beam qualities for the M beams of the further group of neighbouring cell beams.

In one aspect of the invention there is provided a method, performed by a communication device, the method comprising: a) measuring in a first cell a respective beam quality for each of a plurality of beams of the first cell; b) identifying, within said plurality of beams of the first cell, a group of first cell beams comprising a number, N, of beams wherein each beam of said group of first cell beams exhibits a respective measured beam quality that is among N best measured beam qualities arising from said measuring in the first cell; c) measuring in at least one second cell a respective beam quality for each of a plurality of beams of the at least one second cell; d) identifying, within said plurality of beams of the at least one second cell, at least one group of second cell beams comprising a number, N, of beams wherein each beam of said at least one group of second cell beams exhibits a respective measured beam quality that is among N best measured beam qualities arising from said measuring in the at least one second cell; e) selecting, from within said group of first cell beams and said at least one group of second cell beams, a further group of beams comprising a number, M, of beams, wherein each beam of said further group exhibits a respective measured beam quality that is among M best measured beam qualities arising from said measuring in the first cell and said measuring in the at least one second cell; f) deriving a cell quality for the first cell based on the measured beam qualities for beams of the first cell that are within the further group; and g) deriving a cell quality for the at least one second cell based on the measured beam qualities for beams of the at least one second cell that are within said further group.

In one aspect of the invention there is provided a method, performed by a base station, the method comprising: a) sending a message to at least one UE to configure the at least one UE to perform cell quality measurements in at least one cell in which a plurality of beams are provided; and b) receiving, from the UE, a measurement report comprising at least one cell quality derived for the at least one cell, based on measurements of beam quality for at least a selection of said beams, using a method according to any of the above aspects.

In one aspect of the invention there is provided a communication device comprising: a controller and a transceiver wherein the controller is operable to: a) measure a respective beam quality for each of a plurality of beams of a cell; b) identify, within said plurality of beams, a first group of beams comprising a number, N, of beams wherein each beam of said first group exhibits a respective measured beam quality that is among N best measured beam qualities arising from said measuring; c) select, from within said first group of beams, a second group of beams comprising a number, M, of beams that have a measured beam quality that is better than, or equal to, a best measured beam quality for the beams within said first group less a preconfigured offset; d) derive a cell quality for the cell based on the measured beam qualities for the M beams of the second group.

In one aspect of the invention there is provided a communication device comprising: a controller and a transceiver wherein the controller is operable to: a) measure, in a serving cell for the communication device, a respective beam quality for each of a plurality of beams of the serving cell; b) identify, within said plurality of beams of the serving cell, a group of serving cell beams comprising a number, N, of beams, wherein each beam of said group of serving cell beams exhibits a respective measured beam quality that is among N best measured beam qualities arising from said measuring in a first cell, and wherein the group of serving cell beams comprises a best serving cell beam that exhibits a best measured beam quality in said group of serving cell beams; c) measure in a neighbouring cell of the serving cell a respective beam quality for each of a plurality of beams of the neighbouring cell; d) identify, within said plurality of beams of the neighbouring cell, a group of neighbouring cell beams comprising a number, N, of beams wherein each beam of said group of neighbouring cell beams exhibits a respective measured beam quality that is among N best measured beam qualities arising from said measuring in a neighbouring cell and wherein the group of neighbouring cell beams comprises a best neighbouring cell beam that exhibits a best measured beam quality in said group of neighbouring cell beams; e) compare the measured beam quality for the best serving cell beam with a measured beam quality for the best neighbouring cell beam to identify a lowest measured beam quality between said best serving cell beam and said best neighbouring cell beam; f) select, from within said group of neighbouring cell beams, a further group of neighbouring cell beams comprising a number, M, of beams that have a measured beam quality that is better than, or equal to, the determined lowest measured beam quality less a pre-configured offset; and g) derive a cell quality for the neighbouring cell based on the measured beam qualities for the M beams of the further group of neighbouring cell beams.

In one aspect of the invention there is provided a communication device comprising: a controller and a transceiver wherein the controller is operable to: a) measure in a first cell a respective beam quality for each of a plurality of beams of the first cell; b) identify, within said plurality of beams of the first cell, a group of first cell beams comprising a number, N, of beams wherein each beam of said group of first cell beams exhibits a respective measured beam quality that is among N best measured beam qualities arising from said measuring in the first cell; c) measure in at least one second cell a respective beam quality for each of a plurality of beams of the second cell; d) identify, within said plurality of beams of the at least one second cell, at least one group of second cell beams comprising a number, N, of beams wherein each beam of said at least one group of second cell beams exhibits a respective measured beam quality that is among N best measured beam qualities arising from said measuring in the at least one second cell; e) select, from within said group of first cell beams and said at least one group of second cell beams, a further group of beams comprising a number, M, of beams, wherein each beam of said further group exhibits a respective measured beam quality that is among M best measured beam qualities arising from said measuring in the first cell and said measuring in the at least one second cell; f) derive a cell quality for the first cell based on the measured beam qualities for beams of the first cell that are within the further group; and g) derive a cell quality for the at least one second cell based on the measured beam qualities for beams of the at least one second cell that are within said further group.

In one aspect of the invention there is provided a base station comprising: a controller and a transceiver wherein the controller is operable to control the transceiver to: a) send a message to at least one UE to configure the at least one UE to perform cell quality measurements in at least one cell in which a plurality of beams are provided; and b) receive, from the UE, a measurement report comprising at least one cell quality derived for the at least one cell, based on measurements of beam quality for at least a selection of said beams, using a method as set out above.

In one aspect of the invention there is provided a communication system comprising at least one base station as set out above that operates at least one cell and a communication device as set out above.

Aspects of the invention extend to computer program products such as computer readable storage media having instructions stored thereon which are operable to program a programmable processor to carry out a method as described in the aspects and possibilities set out above or recited in the claims and/or to program a suitably adapted computer to provide the apparatus recited in any of the claims.

Each feature disclosed in this specification (which term includes the claims) and/or shown in the drawings may be incorporated in the invention independently (or in combination with) any other disclosed and/or illustrated features. In particular but without limitation the features of any of the claims dependent from a particular independent claim may be introduced into that independent claim in any combination or individually Whilst specific hardware apparatus having a specific physical structure (e.g. controllers and transceiver circuitry) have been disclosed for performing the various procedures described herein, each step of the methods disclosed in the description and/or forming part of the claims, may be implemented by any suitable means for performing that step. In accordance with this each method aspect of the invention has a corresponding apparatus aspect comprising respective means for performing each step of that method aspect.

Example embodiments of the invention will now be described by way of example only with reference to the attached figures in which:

BRIEF DESCRIPTION OF DRAWINGS

FIG. 1 schematically illustrates a telecommunications network;

FIG. 2 is a block diagram illustrating the main components of an item of user equipment for the telecommunications network shown in FIG. 1;

FIG. 3 is a block diagram illustrating the main components of a base station for the telecommunications network shown in FIG. 1;

FIG. 4 is a flow diagram illustrating a method of cell quality derivation;

FIG. 5 illustrates an example of beam selection in accordance with the method of FIG. 4;

FIG. 6 is a flow diagram illustrating another method of cell quality derivation;

FIG. 7 illustrates an example of beam selection in accordance with a variation of the method of FIG. 6;

FIG. 8 is a flow diagram illustrating another method of cell quality derivation;

FIG. 9 illustrates an example of beam selection inaccordance with the method of FIG. 8; and FIG. 10 is a simplified sequence diagram illustrating measurement configuration.

DESCRIPTION OF EMBODIMENTS

Overview

FIG. 1 schematically illustrates a telecommunications network 1 in which user equipment 3-1 to 3-4 (mobile telephones and/or other mobile devices) can communicate with each other via base stations 5-1 to 5-4 (denoted 'gNB') using an appropriate radio access technology (RAT). It will be appreciated that in 5G systems base stations are also referred to as transmit receive points (TRPs). As those skilled in the art will appreciate, whilst four UEs 3 and four base stations 5 are shown in FIG. 1 for illustration purposes, the system, when implemented, will typically include other base stations and mobile devices.

Each base station 5 operates one or more associated cells either via a TRP located at the base station (and/or one or more remotely located TRPs). In this example, for simplicity, each base station 5-1 to 5-4 operates a single cell 10-1 to 10-4 respectively. The base station 5 is connected to a core network 7 (e.g. via an appropriate gateway and/or user-plane/control function) and neighbouring base stations are also connected to each other (either directly or via an appropriate base station gateway). The core network 7 may include, amongst others, a control plane manager entity and a user plane manager entity, one or more gateways (GWs) for providing a connection between the base stations 5 and other networks (such as the Internet) and/or servers hosted outside the core network.

The UE 3 connects to an appropriate cell (depending on its location and possibly on other factors, e.g. signal conditions, subscription data, capability, and/or the like) by establishing a radio resource control (RRC) connection with the base station 5 operating that cell. The UE 3 and base stations 5 (and other transmission points in the network) communicate over an appropriate air interface which depends on the RAT used. The UEs 3 communicate with core network nodes using so-called non-access stratum (NAS) signalling, which is relayed between the UE 3 and the appropriate core network node by the base station 5/TRP serving the UE 3.

In this example, each base station 5 operates an associated antenna array (e.g. a massive antenna) for providing a plurality of directional beams for communicating with the various UEs 3 in each base station's 5 cell. Each beam is arranged to span (transmit) in a different direction (in three dimensions, including elevation angle (azimuth)). Each beam has an associated identifier (e.g. an appropriate 'Beam ID') which is unique (at least within the cell). It will be appreciated that whilst FIG. 1 shows, for reasons of clarity, only a selection of the beams that a single base station 5-1 provides, in reality each base station 5 will provide its own beams that form one or more associated cells.

The beam configuration used in the cell defines the number of beams and the associated beam patterns.

Each UE 3 is configured to derive cell quality level measurements, for each cell 10 that it is able to measure, based on a selection of beams from that cell 10.

Beneficially, the beams to be used for the cell quality level derivation for a given cell are selected, from an initial group of best beams for that cell (which may comprise a single best beam), based on a quality measurement (e.g. reference signal received power (RSRP)) of the best beam either within that cell 10 or another cell 10.

In one example, the beams to be used for the cell quality level derivation for a given cell are selected, from an initial group of best (highest measured quality) beams for that cell (which may comprise a single best beam), based on whether or not the quality measurement falls within a range having an upper limit equal to the quality measured for the best beam within that cell 10, and a lower limit equal to the quality measured for the best beam within that cell 10, less a preconfigured offset.

In one example, the cell quality level derivation for a given cell 10 beneficially takes the correlation between different beams in that cell 10 into account.

In another example, for a given neighbouring or target cell 10, the UE 3 beneficially performs a comparison of the measured quality for the best beam in its serving cell 10 with the measured quality for the best beam in that neighbouring or target cell 10. The UE 3 identifies the beam having the lowest quality of the two compared beams. The UE 3 then sets the lower limit of a beam selection quality range to be equal to the measured quality for the identified lowest quality beam less a preconfigured offset. The beams to be used for the cell quality level derivation for a given cell are then selected, from an initial group of best beams for that cell (which may comprise a single best beam), based on whether or not the quality measurement is above the lower limit.

In another example, the UE 3 aggregates initial groups of beams from a plurality of measured cells and selects a group of the best beams from all the aggregated beams. The selected beams in this group of best beams may be beams having a quality above the measured quality of the best beam less a pre-configured offset. The cell quality level derivation for a given cell is then performed based on the beams for that cell that are present in the group of best beams for the plurality of cells.

UE

FIG. 2 is a block diagram illustrating the main components of an item of user equipment 3 shown in FIG. 1 (e.g. a mobile telephone or other user equipment).

As shown, the UE 3 has a transceiver circuit 31 that is operable to transmit signals to and to receive signals from a base station 5 via one or more antenna 33. The UE 3 has a controller 37 to control the operation of the UE 3. The controller 37 is associated with a memory 39 and is coupled to the transceiver circuit 31. Although not necessarily required for its operation, the UE 3 might of course have all the usual functionality of a conventional mobile telephone 3 (such as a user interface 35 ) and this may be provided by any one or any combination of hardware, software and firmware, as appropriate. Software may be pre-installed in the memory 39 and/or may be downloaded via the telecommunications network or from a removable data storage device (RMD), for example.

The controller 37 is configured to control overall operation of the UE 3 by, in this example, program instructions or software instructions stored within the memory 39. As shown, these software instructions include, among other things, an operating system 41, a communications control module 43, a beam measurement module 44, a beam selection module 45, a filtering module 46, a cell quality derivation module 47 and a measurement reporting module 49.

The communications control module 43 is operable to control the communication between the UE 3 and its serving base station(s) 5 (and other communication devices connected to the base station 5, such as further UEs and/or core network nodes).

The beam measurement module 44 is responsible for detecting beams (in the serving and/or neighbouring cells) and performing a quality measurement (e.g. reference signal received power (RSRP)) on the detected beams. The beam selection module 45 is responsible for performing initial selection of the best beams and secondary selection of beams, from the initially selected group of beams, for use in the derivation of a cell quality measurement. The filtering module 46 is responsible for performing layer 1 (L1) and layer 3 (L3) type filtering. The cell quality derivation module 47 is responsible for the derivation of cell quality for the selected beams. The measurement reporting module 49 is responsible for generating measurement reports, including cell quality related information, and sending them to a base station 5.

Base Station

FIG. 3 is a block diagram illustrating the main components of a base station 5 as shown in FIG. 1. As shown, the base station 5 has a transceiver circuit 51 for transmitting signals to and for receiving signals from the communication devices (such as mobile devices 3/user equipment) via one or more antenna 53 (e.g. an antenna array/massive antenna), and a network interface 55 for transmitting signals to and for receiving signals from network nodes (e.g. other base stations and/or nodes in the core network 7). The base station 5 has a controller 57 to control the operation of the base station 5. The controller 57 is associated with a memory 59. Software may be pre-installed in the memory 59 and/or may be downloaded via the communications network 1 or from a removable data storage device (RMD), for example. The controller 57 is configured to control the overall operation of the base station 5 by, in this example, program instructions or software instructions stored within the memory 59. As shown, these software instructions include, among other things, an operating system 61, a communications control module 63, a beam control module 64, and a measurement configuration module 66.

The communications control module 63 is operable to control the communication between the base station 5 and UEs 3 and other network entities that are connected to the base station 5. The communications control module 63 also controls the separate flows of downlink user traffic (via associated data radio bearers) and control data to be transmitted to communication devices associated with this base station 5 including, for example, control data for core network services and/or mobility of the UE 3 (also including general (non-UE specific) system information and reference signals).

The beam control module 64 is responsible for managing the associated beams for each UE 3 in the cell (or cells) of the base station 5. This includes, for example, adding and removing cells (e.g. based on information such as signal measurements provided by the UE 3, mobility of the UE 3, and/or other information relevant to the cell, such as load information).

The measurement configuration module 66 is responsible for configuring UEs 3 for performing and reporting cell quality measurements (and/or related information such as, for example, correlation calculations) obtained based on the beams in the vicinity of the UEs 3 (e.g. cells/beams operated by this base station 5 and/or a neighbouring base station). The measurement configuration module 66 obtains cell quality measurements (and/or related information) by generating and sending an appropriate measurement configuration to a particular mobile device 3 and by receiving an associated measurement report. The measurement report may be used, for example, when performing a mobility and/or beam configuration procedure involving the UE 3 that provided the report.

In the above description, the mobile device 3 and the base station 5 are described for ease of understanding as having a number of discrete modules (such as the communications control modules and the beam configuration/control modules). Whilst these modules may be provided in this way for certain applications, for example where an existing system has been modified to implement the invention, in other applications, for example in systems designed with the inventive features in mind from the outset, these modules may be built into the overall operating system or code and so these modules may not be discernible as discrete entities. These modules may also be implemented in software, hardware, firmware or a mix of these.

A more detailed description will now be given (with reference to FIGS. 4 to 9) of some ways in which cell quality can be derived.

'Best Beam' Selection for Derivation of Cell Level Quality (A) No Beam Correlation is Considered in Cell Quality Derivation (Selection of Beams per Cell)

FIG. 4 is a flow diagram illustrating, by way of example only, a method of cell quality derivation in which beam correlation is not considered.

As seen in FIG. 4, initially, for a given cell 10, the UE 3 detects the beams in that cell 10 at S410 and performs L1 filtering on all the detected beams at S412.

At S414 the UE 3 selects, for the given cell 10, a number, N, of beams (where N may be one) deemed to have the best quality (e.g. highest measured RSRP) from the detected beams in that cell 10. Where the UE 3 detects N or more beams in the cell 10 the UE 3 may choose only the N best beams. Where the UE 3 detects N or fewer beams in a given cell 10 then the UE 3 may choose all the detected beams.

At S416 the UE 3 performs, for the given cell 10, L3 filtering for the selected N best beams. At S418 the UE 3 then selects, from the selected N best beams, the M beams (where M is not greater than N) that have a measured RSRP falling within a configured range between a measured RSRP of the best (highest quality) beam and a measured RSRP of the best (highest quality) beam less a pre-configured offset (in dBs).

At S420 the UE then derives a measure of cell quality by combining the RSRP measurements of the selected M beams having a measured quality falling within the configured range. This derivation may be done in any suitable manner, for example, based on; an average; a weighted sum, and/or a maximum of the RSRP measurements of the selected M beams.

As indicated by the feedback loop at S422 the UE 3 then repeats this procedure for each cell.

FIG. 5 illustrates UE beam selection, in accordance with the method of FIG. 4, of the M best beams (per cell) within a beam quality range having a lower limit given by:

$$Q_{bestbeam} - \text{offset}$$

Where; $Q_{bestbeam}$ is the beam quality measurement obtained from the best beam (e.g. max RSRP) in a cell; and offset is a quantity in dB below $Q_{bestbeam}$ (e.g. 1 dB, 2 dB).

In the example illustrated in FIG. 5, the number, N, of initially selected beams in each cell (cell#1 and cell#2) is N=3, the $Q_{bestbeam}$ measurement is RSRP=5 dBm (in both cells) and the Offset=2 dB (in both cells). Accordingly, the UE will select the best beam and a maximum of M-1 beams that fall in the beam quality range between 5 dBm and 3 dBm and that form part of the N initially selected beams.

In cell#1 four beams fall within the range 5 dBm to 3 dBm (having RSRPs=5 dBm, 4.5 dBm, 4 dBm, and 3 dBm respectively) and so all three initially selected beams (having RSRPs=5 dBm, 4.5 dBm and 4 dBm) are selected as part of the M best beams (i.e. M=N=3). In cell#2 only the best quality beam falls within the range 5 dBm to 3 dBm (having RSRP=5 dBm) so only one of the initially selected beams (having RSRP=5 dBm) is selected as the M best beam.

(B) Beam Correlation is Considered in Cell Quality Derivation (Selection of Beams per Cell)

FIG. 6 is a flow diagram illustrating, by way of example only, a method of cell quality derivation in which beam correlation is considered.

As seen in FIG. 6 the method is similar to that of FIG. 4. As with the method described with reference to FIG. 4, initially, for a given cell 10, the UE 3 detects the beams in that cell 10 at S610 and performs L1 filtering on all the detected beams at S612.

Unlike the method of FIG. 4, however, the UE 3 determines, at S624, a measure of the mutual correlation between the N selected beams and calculates a function of that correlation. The function of the correlation may provide, for example:
  i) the number of beams exhibiting a low correlation within the N best beams;
  ii) the respective correlation coefficients for each different pair of the N best beams (e.g. the N×(N-1)/2 coefficients); and /or
  iii) the difference in RSRP between the strongest beam (e.g. Beam1) and the strongest beam with low correlation to Beam1 (for example, the minimum difference in RSRP between Beam1 and the beam (Beam j) with a correlation to Beam1 below a pre-determined correlation threshold value—i.e. min{RSRP(Beam1)−RSRP (Beam j)}with Correlation(Beam j, Beam1)<threshold).

The output of the function may, optionally, be subject to L3 filtering at S626.

In parallel with the measurement of mutual correlation, at S614 the UE 3 selects, for the given cell 10, a number, N, of beams (where N may be one) deemed to have the best quality (e.g. highest measured RSRP) from the detected beams in that cell 10. Where the UE 3 detects N or more beams in the cell 10 the UE 3 may choose only the N best beams. Where the UE 3 detects N or fewer beams in a given cell 10 then the UE 3 may choose all the detected beams.

At S616 the UE 3 performs, for the given cell 10, L3 filtering on the selected N best beams. At S618 the UE 3 then selects, from the selected N best beams, the M beams (where M is not greater than N) that have a measured RSRP falling within a configured range between a measured RSRP of the best (highest quality) beam and a measured RSRP of the best (highest quality) beam less a pre-configured offset (in dBs).

At S620 the UE then derives a measure of cell quality by combining the RSRP measurements of the selected M beams having a measured RSRP falling within the configured range taking into account the (possibly L3 filtered) output of the inter-beam mutual correlation function calculation at S624. This derivation may be done in any suitable manner, for example, based on: an average; a weighted sum, and/or a maximum of the RSRP measurements of the selected M beams.

As indicated by the feedback loop at S622 the UE 3 then repeats this procedure for each cell.

FIG. 7 illustrates UE beam selection, in accordance with a beneficial variation of the method shown in FIG. 6. In this variation, the selection of beams from the initially selected group of beams in a given target cell 10, occurring at S618, may take the quality of the best beam in the current cell serving the UE 3 into account to provide for a more cell quality indicative selection of beams in each neighbouring cell, and hence provide for an improved cell quality measurement.

In more detail, at S618 the UE 3 may make a comparison of the measured RSRP of the best beam of the serving cell (e.g. cell 10-1), and a given target neighbouring cell (e.g. cell 10-2), and use a range with a lower limit based on the lowest RSRP of the compared beams, less the pre-configured offset (in dBs), as the basis for selecting the M best beams for that neighbouring cell.

In this case, in addition to the best beam for a given neighbouring cell, the UE 3 would thus include, in its selection from the selected N best beams, any other beams that have a measured RSRP above the lowest RSRP of the compared beams less the pre-configured offset (in dBs).

The lower limit of the selection range can be represented as follows:

$$\text{Minimum}(Q_{bestbeam}(\text{target}), Q_{bestbeam}(\text{serving})) - \text{offset}$$

Where: $Q_{bestbeam}$ (target) is the beam quality measurement obtained from the best beam (e.g. max RSRP) in a neighbouring (target') cell; $Q_{bestbeam}$ (serving) is the beam quality measurement obtained from the best beam (e.g. max RSRP) in the current ('serving') cell; and offset is a quantity in dB below $Q_{bestbeam}$ (e.g. 1 dB, 2dB).

In the example illustrated in FIG. 7, the number, N, of initially selected beams in the serving cell (cell#1) and target cell (cell#2) is N=3. The $Q_{bestbeam}$ measurement in the serving cell is RSRP=5 dBm and the $Q_{bestbeam}$ measurement in the target cell is RSRP=8 dBm. The Offset=2dB in both cells.

In the serving cell four beams fall within the range 5 dBm to 3 dBm (having RSRPs=5 dBm, 4.5 dBm, 4 dBm, and 3 dBm respectively) and so all three initially selected beams (having RSRPs=5 dBm, 4.5 dBm and 4 dBm) are selected as part of the M best beams (i.e. M=N=3).

In the neighbouring target cell, the best quality beam has a measured RSRP (8 dBm) that is greater than the RSRP (5 dBm) of the best beam of the serving cell. Accordingly, the lower limit of the range for beam selection is calculated, based on the 5 dBm RSRP of the serving cell, to be 3 dBm. Accordingly, in addition to the best quality beam in the neighbouring target cell, two further beams (having RSRPs=4 dBm and 3.5 dBm) are selected for use in the cell quality derivation.

It can be seen that, in this example, had the best quality beam of the neighbouring target cell be used as the basis for determining the lower limit of the selection range, then only the best beam would have been selected (because the lower limit of the selection range would have been 6 dB). This could potentially have given an unrealistically high measurement of cell quality.

It will be appreciated that whilst this variation has been discussed with reference to FIG. 6 it may also be used in the corresponding beam selection steps of the other methods described herein.

(C) Beam Correlation is Considered in Cell Quality Derivation (Selection of Best Beams From all Measured Cells)

FIG. 8 is a flow diagram illustrating, by way of example only, a method of cell quality derivation in which beam correlation is considered.

As with the method described with reference to FIG. 6, initially, for each cell 10 (cells 1,2 . . . r), the UE 3 detects the beams in that cell 10 at S810 and performs L1 filtering on all the detected beams at S812.

For each cell 10, the UE 3 determines, at S824, a measure of the mutual correlation between the N selected beams and calculates a function of that correlation. The function of the correlation may provide, for example, the number of beams exhibiting a low correlation within the N best beams for that cell 10. The function of the correlation may provide, for example:

i) the number of beams exhibiting a low correlation within the N best beams;
ii) the respective correlation coefficients for each different pair of the N best beams (e.g. the N×(N−1)/2 coefficients); and/or
iii) the difference in RSRP between the strongest beam (Beam1) and the strongest beam with low correlation to Beam1 (for example, the minimum difference in RSRP between Beam1 and the beam (Beam j) with a correlation to Beam1 below a pre-determined correlation threshold value—i.e. min{RSRP(Beam1)−RSRP (Beam j)} with Correlation(Beam j, Beam1)<threshold).

The output of the function may, optionally, be subject to L3 filtering at S826.

In parallel with the measurement of mutual correlation, at S814 the UE 3 selects, for the each cell 10, a number, N, of beams (where N may be one) deemed to have the best quality (e.g. highest measured RSRP) from the detected beams in that cell 10. Where the UE 3 detects N or more beams in the cell 10 the UE 3 may choose only the N best beams. Where the UE 3 detects N or fewer beams in a given cell 10 then the UE 3 may choose all the detected beams.

At S816 the UE 3 performs, for each cell 10, L3 filtering on the selected N best beams.

Unlike the methods described with reference to FIGS. 3 and 5, at S818 the UE 3 aggregates the RSRP results for all the measured cells and selects the M beams that have the best measured RSRP. This may comprise all the beams having a measured RSRP falling within a configured range between the measured RSRP of the best quality beam in all cells and the measured RSRP of the best quality beam in all cells less a pre-configured offset (in dBs). It will be appreciated that where a configured offset is used it may be different to the offset value configured for the methods of FIGS. 3 and/or 5 (especially considering that the value of M for the method of FIG. 8 may be larger than the value of M for the methods of FIGS. 3 and/or 5).

In the event that the M best beams in all measured cells do not include the best quality beam in the serving cell then the best quality beam from that serving cell is also selected, even though it does not belong to the M best beams. A best beam from a given neighbouring cells may also (optionally) be included in the selection even if it does not fall within the M best beams.

At S820 the UE 3 then derives a measure of cell quality, for each cell (cell i) based on the quality measurement(s) of the Mi selected beam(s) in that cell (cell i) taking into account the (possibly L3 filtered) output of the inter-beam mutual correlation function calculation at S824 for that cell. This derivation may be done in any suitable manner, for example, based on: an average; a weighted sum; and/or a maximum of the quality measurements of the selected M beams.

It can be seen, therefore, that where an offset is used in the method of FIG. 8, the beam selection at S818 selects the M best beams (among all detected beams in all measured cells) within a beam quality range having a lower limit given by:

$$Q_{bestbeam} \text{ (all)} - \text{offset}$$

Where: $Q_{bestbeam}$ (all) is the beam quality measurement obtained from the best beam (e.g. max RSRP) among all detected beams in all measured cells; and offset is a quantity in dB below $Q_{bestbeam}$ (all) (e.g. 1 dB, 2 dB).

It will be appreciated that in addition to selecting the M best beams that fall with the selection range extending from this lower limit to $Q_{bestbeam}$ (all), the best quality beam for the serving cell is included in the selection even if it does not belong to the M best beams.

FIG. 9 illustrates UE beam selection, in accordance with the method of FIG. 8, where an offset is not used but, instead a predetermined number, M, of beams are selected at S818.

In the example illustrated in FIG. 9, there are only two cells and the number, N, of initially selected beams in each cell (cell#1 and cell#2) is N=4 and M=6. The $Q_{bestbeam}$ measurement in cell#1 is RSRP=5 dBm and the $Q_{bestbeam}$ measurement in cell#2 is RSRP=8 dBm.

In cell#1 the N (4) beams initially selected fall within the range 5 dBm to 3 dBm (having RSRPs=5 dBm, 4.5 dBm, 4 dBm, and 3 dBm respectively). In cell#2 there N (4) beams initially selected fall within the range 8 dBm to 6 dBm (having RSRPs=8 dBm, 7.5 dBm, 6.5 dBm, and 6 dBm respectively). Accordingly, the M (6) best beams selected from the aggregated set of (8) beams for both cells comprises all four of the beams initially selected in cell#2 (i.e. M2=4) and the two best beams initially selected in cell#1 (M1=2).

The UE 3 can then derive a measure of cell quality, for cell#1 and for cell#2, based on the quality measurements of the respective selected beams in each cell.

Calculation of Correlation Between Beams

There are a number of different ways in which correlation between beams, in any of the corresponding methods described above, can be measured.

Two possible options for the calculation of correlation between beams will now be described, by way of example only.

In the first option, the correlation between two beams is estimated over a sufficiently large period of time, and a sufficiently large number of blockage events, to provide a sufficiently precise measure of correlation. This may be done, for example, by calculating a Pearson coefficient between the respective sequences of measurements (e.g. measured RSRP values, measured number of detected blockings) for each of the two beams.

In the second option, if the required averaging period for the first option is too long to measure correlation directly, the correlation can be estimated from a proxy measurement. For example, correlation may be estimated from the propagation delay or other properties of a respective power delay profile for each beam based on the assumption that beams with widely differing propagation delays are likely to have low correlation. The angle-of-arrival of each of the transmission beams could also be taken into account (in particular if the UE reception beam for each beam is different).

Derivation of Cell Level Quality (General Case)

There are a number of different ways in which cell quality may be derived from the quality measurements for the selected beams (for any of the methods described above).

In a general case, the UE 3 can calculate the cell quality, as a function of one or more of the parameters: quality of the selected best beams in a cell ($Qbeam_1$, $Qbeam_2$, ..., $Qbeam_M$); number of selected best beams in a cell (M); and/or a function of the correlation between beams in the cell (C). Hence, the cell quality derivation may be represented generally as follows;

$$\text{Cell Level } Quality = f(Qbeam_1, Qbeam_2, \ldots, Qbeam_M, M, C) \quad [\text{Math.1}]$$

By way of example, the function f( ) may be: an average (or max or sum) of beam qualities (Qbeam) plus a correction term derived from M and C; or an estimate of the probability of outage (fraction of time that cell quality remains below a given level) derived from some assumed probability distribution parameterised by Qbeam, M and C.

Referring to the values of M and C, it can be seen that cell reliability will tend to increase with the number of best beams that can be selected in a cell within the beam quality selection range (i.e. increases with M). Conversely, cell reliability will tend to decrease with an increase in correlation between the M beams (i.e. decreases with increased C). The value of C may be determined based on correlation coefficients between every possible pair of the M beams (number of coefficients=M×(M−1)/2). The value of C may be determined based on the respective correlation coefficients between the best beam and each of the other beams (number of coefficients=M−1). It will be appreciated that the function of the correlation described with reference to FIGS. 6 and 8 (e.g. options and/or i)ii), and/or iii)) may also be applied here.

Derivation of Cell Level Quality (Using Weighted Sum)

In one example, the UE 3 can derive cell quality based on a weighted sum (for any of the methods described above).

In this example, the UE 3 sorts the selected M best beams based on their quality values so that the quality for a beam having an index=1 ($Qbeam_1$) is the best beam quality, the quality for a beam having an index=2 ($Qbeam_2$) is the $2^{nd}$ best quality beam, etc.. The UE 3 then calculates the cell quality by summing weighted values of the beams qualities over all M beams to provide a measure of cell level quality as follows:

$$\text{Cell Level } Quality = \sum_{i=1}^{i=M} W_i \times QBeam_i \quad [\text{Math.2}]$$

Where Wi is a weight applied to Qbeami.

In general, the UE 3 is preferably served by the strongest beam in a given cell. Accordingly, higher weights ($W_i$) are assigned to the strongest beams and lower weights to the weaker beams in order to weight each beam's contribution, in the total sum for M beams, appropriately. For example, the weights could be set as follows:

$$W_i = \alpha^i \quad [\text{Math.3}]$$

Where $\alpha$ is a configurable parameter that has a positive value that is less than 1 so that the weight decreases with increased beam index i.

In a variation on this the 'weight' applied for a given beam is dependent on the correlation between that beam and the highest quality beam as follows:

$$\text{Cell Level } Quality = Qbeam_1 + \sum_{i=2}^{i=M} \beta(1 - |C_{1,i}|)(Qbeam_i) \quad [\text{Math.4}]$$

Where $\beta$ is a configurable value and $C_{1,i}$ is a measure of the correlation between the beam having a beam index=1 and the beam having a beam index=i. Hence, in this example, for a given measured beam quality, a beam exhibiting a low correlation to the best quality beam provides a greater contribution to the cell level quality measurement than a beam with a high correlation to the best quality beam.

Beneficially, therefore, a cell level quality derived for a neighbouring cell in which beams are highly correlated will be less than a cell level quality derived for a neighbouring cell in which beams are of low correlation.

Reporting

Beneficially, the derived cell quality measurements (in any of the methods described above) can be provided using a measurement report comprising one or more of the following measurements objects: Cell Level Quality; number of selected best beams (M); and/or correlation coefficients for the M best beams.

The reporting may, for example, be explicit in which case the UE 3 may include all measurement objects (Cell Level Quality, number of selected best beams, and correlation coefficients) in the measurement report. In this case, the reported cell quality may be calculated as a function of the M best beams measurements (CellQuality=f($Qbeam_1$, ..., $Qbeam_M$) where, for example, $Qbeam_i$ is an RSRP measurement.

The reporting may, for example, be implicit in which case the UE 3 may simply include the Cell Level Quality object where the Cell Quality Level is calculated as a function of M best beams measurements, number of beams, and the M best beams correlation coefficients.

The reporting may, for example, be a hybrid of the explicit and implicit reporting, in which case the UE 3 may include the Cell Level Quality object (where the Cell Quality Level is calculated as a function of M best beams measurements and the M best beams correlation coefficients) and the number of M best beams measurement object.

These reporting options will now be described in more detail, by way of example only, with reference to FIG. 10 which is a simplified sequence diagram illustrating how cell quality level measurements may be configured for the purpose of a handover procedure.

As seen in FIG. 10 a base station 5-1 (operating as a source base station in this example) configures, at S1010, one or more UEs 3 that it serves to perform measurements of the serving cell 10-1 operated by the base station 5-1 and of any neighbouring cell 10-2, 10-3, 10-4 that the UE(s) 3 can detect. In FIG. 10, the base station 5-1 uses a 'measconfig' information element IE to configure the measurements at the UE(s) 3 but it will be appreciated that any suitable message/IE may be used.

The base station 5-1 may, for example, include (e.g. in the measconfig IE) one or more measurement object IEs comprising appropriate configuration information for the measurements. This configuration may include, for example, one or more of the following: a carrier frequency ('carrierFreq') identifying the carrier frequency for which this configuration is valid; an offset ('offsetFreq') defining an offset value applicable to the carrier frequency; a list of cells to remove from the neighbouring cell list (e.g. a cellsToRemoveList); a list of cells to add/modify in the neighbouring cell list (e.g. a cellsToAddModList); an individual offset for one or more cells in the list of cells to add/modify (e.g. a cellIndividualOffset); one or more beam offsets to be applied when selecting the M best beams in a cell (e.g. in a method as described with reference to FIG. 4, 6 and/or 8 above); the number, N, of initially selected beams; and/or the like.

It will be appreciated that, within the measurement configuration the value(s) of, N, and the offset value(s) may be configured on a per cell basis, a per frequency basis, or as a general configuration per UE.

The base station 5-1 may, for example, include (e.g. in the measconfig IE) one or more one or more report configuration IEs (e.g. a reportconfig IE) comprising configuration information for configuring one or more cell quality reporting trigger events and, where appropriate, associated trigger thresholds, offsets, and/or hysteresis values. Where the system allows for different types of reporting as described above, the base station 5-1 may, for example, include (e.g. in the measconfig IE) one or more report configuration IEs comprising an indication of the type of reporting (e.g. explicit, implicit, hybrid) to be performed by the UE(s) 3.

Each UE 3 performs, at S1012, beam quality measurements on the serving cell and neighbouring cell(s) in accordance with the measurement configuration information. The UE 3 then derives, S1014, a cell level quality based on the measurements (e.g. using one of the techniques described above) before reporting the cell level quality to the base station 5-1 at S1016.

It will be appreciated that the reporting will, typically, be event triggered based on the configured reporting triggers (e.g. based on configured trigger thresholds, offsets, and/or hysteresis values). The UE 3 will thus check a triggering condition (based on, among other things, the cell level quality measurements and configured reporting triggers) to determine whether the measurement report is to be sent.

As described above, the UE 3 may derive a cell level quality based on a function of the results of measurements performed on the M best beams. The UE 3 may report the resulting cell level quality, to the base station 5-1, together with the number of best beams, M, and a result, C, of a function of calculated correlation(s) for all (or a selection of) possible beam pairings (e.g. as shown at S1016-1) and possibly other parameters (e.g. the function of the correlation described with reference to FIGS. 6 and 8 (e.g. options i), ii), and/or iii)) above).

The UE 3 may derive a cell level quality based on a function of the results of measurements performed on the M best beams, the number of best beams, M, and a result, C, of a function of calculated correlation(s) for all (or a selection of) possible beam pairings. The UE 3 may report the resulting cell level quality, to the base station 5-1 (without separately including the number of best beams, M, and result, C, of a function of calculated correlation(s)) (as shown at S1016-2).

The UE 3 may derive a cell level quality based on a function of the results of measurements performed on the M best beams, and a result, C, of a function of calculated correlation(s) for all (or a selection of) possible beam pairings. The UE 3 may report the resulting cell level quality, to the base station 5-1 together with the number of best beams, M (without separately including the result, C, of a function of calculated correlation(s)) (as shown at S1016-3).

In general, the cell quality derivation and reporting can be independent, i.e. even if M and C are used to derive the cell quality (implicit case), M and C can still be reported explicitly with the cell quality derivation.

The source base station 5-1 makes, at S1018, a decision based on the cell level qualities reported in the measurement report(s) received from the UE 3, and associated radio resource management information to handover the UE 3 and determines an appropriate handover target 5-2. The source base station 5-1 issues, at S1020, a handover request message to the identified target base station 5-2 passing necessary information to prepare the handover at the target side.

Admission Control may be performed by the target base station 5-2 before the target base station 5-2 prepares handover and sends a handover request acknowledge to the source base station 5-1. The target base station 5-2 generates an RRC message (e.g. an RRCConnectionReconfiguration message) to trigger performance of the handover and includes it in a handover request acknowledge sent to the source base station 5-1 at S1022. As soon as the source base station 5-1 receives the handover request acknowledge, or as soon as the transmission of the handover command is initiated in the downlink, data forwarding may be initiated.

The source base station 5-1 sends, at S1024, the RRCConnectionReconfiguration message towards the UE 3 to command performance of handover. The UE 3 receives the RRCConnectionReconfiguration message with necessary parameters and is thus commanded by the source base station 5-1 to perform the handover.

Handover then proceeds with a handover execution phase at S1026 and handover completion phase at S1028. Those skilled in the art will be familiar with such procedures and so they are not being repeated for reasons of brevity.

Modifications and Alternatives

Detailed example embodiments have been described above. As those skilled in the art will appreciate, a number of modifications and alternatives can be made to the above example embodiments whilst still benefiting from the inventions embodied therein. By way of illustration only a number of these alternatives and modifications will now be described.

It will be appreciated that although, in the above description, RSRP is used as the beam quality measurements, other parameters may be used as an alternative to (or in addition to RSRP). For example, Reference Signal Received Quality (RSRQ), Carrier Received Signal Strength Indicator (RSSI), Channel Quality Indicator (CQI), Signal to Interference plus Noise Ratio (SINR), and/or Signal to Noise Ratio (SNR) measurements may be used.

It will be appreciated that the offsets described above could be fixed or could be a value configurable by the network. For example, the offset could be set as a member of a predefined group of possible offsets $$\text{offset} \in \{0,1,2,\ldots,5 \text{ dB}\} \quad \text{[Math.5]}$$

where offset=0 corresponds to only the "best beam" being selected).

It will be appreciated that the UE may also have multiple beams and for each base station transmitted beam the UE may use a different reception beam.

In the above example embodiments, the base station uses a 3GPP radio communications (radio access) technology to communicate with the mobile device. However, any other radio communications technology (i.e. WLAN, Wi-Fi, WiMAX, Bluetooth, etc.) can be used between the base station 5 and the mobile device 3 in accordance with the above embodiments. The above example embodiments are also applicable to 'non-mobile' or generally stationary user equipment.

In the above description, the UE is described for ease of understanding as having a number of discrete functional components or modules. Whilst these modules may be provided in this way for certain applications, for example where an existing system has been modified to implement the invention, in other applications, for example in systems designed with the inventive features in mind from the outset, these modules may be built into the overall operating system or code and so these modules may not be discernible as discrete entities.

In the above description the UE is described as performing the cell quality measurements. It will be appreciated that in a variation on the above the UE may measure beam qualities and provide the beam quality measurements to the base station. The base station may then derive a cell quality (e.g. as described above).

One example described herein comprises a method, performed by a communication device, the method comprising: a) measuring a respective beam quality for each of a plurality of beams of a cell; b) identifying, within said plurality of beams, a first group of beams comprising a number, N, of beams wherein each beam of said first group exhibits a respective measured beam quality that is among N best measured beam qualities arising from said measuring; c) selecting, from within said first group of beams, a second group of beams comprising a number, M, of beams that have a measured beam quality that is better than, or equal to, a best measured beam quality for the beams within said first group less a preconfigured offset; d) deriving a cell quality for the cell based on the measured beam qualities for the M beams of the second group.

The method may further comprise reporting the cell quality to a base station in a measurement report. The method may further comprise determining a correlation between at least one pair of beams of said first and/or second group. Information identifying the correlation (or a value calculated based on said correlation) may be included in said measurement report separately from the derived cell quality. The cell quality may be further derived based on the determined correlation (or a value calculated based on said determined correlation). Information identifying the number, M, of beams in the second group may be included in the measurement report separately from the derived cell quality. The cell quality may be further derived based on the number, M, of beams in the second group.

The cell quality may be derived based on the equation $$\text{Cell Level } Q\text{uality} = f(Q\text{beam}_1, Q\text{beam}_2, \ldots, Q\text{beam}_M, M, C) \quad \text{[Math.6]}$$

where: $Q\text{beam}_i$ is a beam quality measured for a beam having an index, i; M is the number of selected best beams in the second group; and C is a function of the correlation between beams in the cell.

The cell quality may be derived based on the equation $$\text{Cell Level } Q\text{uality} = Q\text{beam}_1 + \sum_{i=2}^{i=M} \beta(1 - |C_{1,i}|)(Q\text{beam}_i) \quad \text{[Math.7]}$$

where $Q\text{beam}_1$ is a beam quality measured for the best beam in the cell, $Q\text{beam}_i$ is a beam quality measured for a beam having an index, i, $\beta$ is a configurable value and $C_{j,i}$ is a measure of the correlation between the beam having a beam index=j and a beam having a beam index=i.

The cell quality may be derived based on the equation $$\text{Cell Level } Q\text{uality} = \sum_{i=1}^{i=M} W_i \times Q\text{beam}_i \quad \text{[Math.8]}$$

where $Q\text{beam}_i$ is a beam quality measured for a beam having an index, i, and $W_i$ is a weight applied to $Q\text{beam}_i$. The weight ($W_i$) may be derived based on the equation $$W_i = \alpha^i \quad \text{[Math.9]}$$

where $\alpha$ is a configurable parameter that has a positive value that is less than 1 and i is a numerical beam index. Each beam of the second group may have a respective numerical beam index i that is dependent on the beam quality of that beam, relative to each other beam in the second group, such that a beam that exhibits a highest beam quality has the lowest index value (e.g. 1) and a beam that exhibits a lowest beam quality has the highest index value (e.g. an index value equal to the number, M, of beams in the second group).

The method may comprise performing filtering (e.g. L3 filtering) on the identified beams in the first group and wherein said selecting, from within said first group of beams, of a second group of beams is performed based on said identified beams in the first group as filtered.

The method may further comprise repeating steps a) to d) for at least one further cell.

One example described herein comprises a method, performed by a communication device, the method comprising: a) measuring, in a serving cell for the communication device, a respective beam quality for each of a plurality of beams of the serving cell; b) identifying, within said plurality of beams of the serving cell, a group of serving cell beams comprising a number, N, of beams, wherein each beam of said group of serving cell beams exhibits a respective measured beam quality that is among N best measured beam qualities arising from said measuring in a first cell, and wherein the group of serving cell beams comprises a best serving cell beam that exhibits a best measured beam quality in said group of serving cell beams; c) measuring in a neighbouring cell of the serving cell a respective beam quality for each of a plurality of beams of the neighbouring cell; d) identifying, within said plurality of beams of the neighbouring cell, a group of neighbouring cell beams comprising a number, N, of beams wherein each beam of said group of neighbouring cell beams exhibits a respective measured beam quality that is among N best measured beam qualities arising from said measuring in a neighbouring cell and wherein the group of neighbouring cell beams comprises a best neighbouring cell beam that exhibits a best measured beam quality in said group of neighbouring cell beams; e) comparing the measured beam quality for the best serving cell beam with a measured beam quality for the best neighbouring cell beam to identify a lowest measured beam quality between said best serving cell beam and said best neighbouring cell beam; f) selecting, from within said group of neighbouring cell beams, a further group of neighbouring cell beams comprising a number, M, of beams that have a measured beam quality that is better than, or equal to, the identified lowest measured beam quality less a pre-configured offset; and g) deriving a cell quality for the neighbouring cell based on the measured beam qualities for the M beams of the further group of neighbouring cell beams.

The method may further comprise repeating steps c) to g) for at least one further neighbouring cell of the serving cell.

One example described herein comprises a method, performed by a communication device, the method comprising: a) measuring in a first cell a respective beam quality for each of a plurality of beams of the first cell; b) identifying, within said plurality of beams of the first cell, a group of first cell beams comprising a number, N, of beams wherein each beam of said group of first cell beams exhibits a respective measured beam quality that is among N best measured beam qualities arising from said measuring in the first cell; c) measuring in at least one second cell a respective beam quality for each of a plurality of beams of the second cell; d) identifying, within said plurality of beams of the at least one second cell, at least one group of second cell beams comprising a number, N, of beams wherein each beam of said at least one group of second cell beams exhibits a respective measured beam quality that is among N best measured beam qualities arising from said measuring in the at least one second cell; e) selecting, from within said group of first cell beams and said at least one group of second cell beams, a further group of beams comprising a number, M, of beams, wherein each beam of said further group exhibits a respective measured beam quality that is among M best measured beam qualities arising from said measuring in the first cell and said measuring in the at least one second cell; f) deriving a cell quality for the first cell based on the measured beam qualities for beams of the first cell that are within the further group; and g) deriving a cell quality for the at least one second cell based on the measured beam qualities for beams of the at least one second cell that are within said further group.

The first cell may comprise a serving cell and the at least one second cell may be at least one neighbouring cell.

One example described herein comprises a method, performed by a base station, the method comprising: a) sending a message to at least one UE to configure the at least one UE to perform cell quality measurements in at least one cell in which a plurality of beams are provided; and b) receiving, from the UE, a measurement report comprising at least one cell quality derived for the at least one cell, based on measurements of beam quality for at least a selection of said beams, using a method as described above.

The method may further comprise making a handover decision based on said at least one cell quality measurement. The decision may be based further on at least one of: a value, M, representing a number of beams selected by the UE to be within a group in which each beam of the group exhibits a respective measured beam quality that is among M best measured beam qualities; and a value of correlation (or a value calculated based on a value of correlation) between at least one pair of beams of said group. At least one of said value, M; and said value of correlation (or a value calculated based on a value of correlation); may be provided in said measurement report.

In the above example embodiments, a number of software modules were described. As those skilled in the art will appreciate, the software modules may be provided in compiled or un-compiled form and may be supplied to the base station, to the mobility management entity, or to the mobile device as a signal over a computer network, or on a recording medium. Further, the functionality performed by part or all of this software may be performed using one or more dedicated hardware circuits. However, the use of software modules is preferred as it facilitates the updating of the base station or the mobile device in order to update their functionalities.

Each controller may comprise any suitable form of processing circuitry including (but not limited to), for example: one or more hardware implemented computer processors; microprocessors; central processing units (CPUs); arithmetic logic units (ALUs); input/output (IO) circuits; internal memories/caches (program and/or data); processing registers; communication buses (e.g. control, data and/or address buses); direct memory access (DMA) functions; hardware or software implemented counters, pointers and/or timers; and/or the like.

Various other modifications will be apparent to those skilled in the art and will not be described in further detail here.

This application is based upon and claims the benefit of priority from United Kingdom patent applications Nos. 1701858.1 and 1702281.5, filed on Feb. 3, 2017 and Feb. 10, 2017, respectively, the disclosures of which are incorporated herein in their entirety by reference.

The invention claimed is:

1. A method, performed by a communication device, the method comprising:
receiving measurement configuration information including a predetermined value and a parameter for defining a predetermined number of beams;
measuring a respective beam quality for each of a plurality of beams of a cell;
identifying M beams whose beam qualities are between a best beam quality among the respective beam quality for the each of the plurality of beams and a lower limit defined by the predetermined value; and
deriving a cell quality for the cell based on linear average of beam qualities of the M beams, and
wherein the M does not exceed the predetermined number of beams defined by the parameter.

2. A communication device comprising:
a memory storing instructions; and
at least one processor configured to process the instructions to:
receive measurement configuration information including a predetermined value and a parameter for defining a predetermined number of beams;
measure a respective beam quality for each of a plurality of beams of a cell;
identify M beams whose beam qualities are between a best beam quality among the respective beam quality for the each of the plurality of beams and a lower limit defined by the predetermined value; and
derive a cell quality for the cell based on linear average of beam qualities for the M beams, and
wherein the M does not exceed the predetermined number of beams defined by the parameter.

* * * * *